United States Patent [19]
Glenn

[11] 3,893,753
[45] July 8, 1975

[54] OPTICAL ATTENUATOR

[75] Inventor: Thomas J. Glenn, Irvine, Calif.

[73] Assignee: Beckman Instruments, Inc., Fullerton, Calif.

[22] Filed: Feb. 25, 1974

[21] Appl. No.: 445,246

[52] U.S. Cl. .................................. 350/271; 350/272
[51] Int. Cl. ................................................ G02f 1/30
[58] Field of Search ................... 354/241, 243, 244; 350/266, 271, 272; 250/229

[56] References Cited
UNITED STATES PATENTS
| | | | |
|---|---|---|---|
| 1,003,536 | 9/1911 | Spinks | 354/241 |
| 2,041,465 | 5/1936 | Gehrke et al. | 350/271 |

FOREIGN PATENTS OR APPLICATIONS
| | | | |
|---|---|---|---|
| 520,956 | 5/1940 | United Kingdom | 354/243 |

Primary Examiner—Ronald L. Wibert
Assistant Examiner—F. L. Evans
Attorney, Agent, or Firm—Robert J. Steinmeyer; Robert R. Meads

[57] ABSTRACT

An optical attenuator for adjusting the amount of radiant energy passing through a variable aperture formed by a pair of apertures in opposing portions of a continuous loop metal strip encircling first and second parallel shafts with the free ends of the strip being secured to one shaft to form the loop. One of the parallel shafts is provided with cam surfaces for adjusting the spacing between the parallel shafts to thereby increase the tension on the continuous loop. Two pairs of rollers abut the outer surfaces of the metal strip to maintain the apertures in the strip in close sliding relationship. One of the shafts is provided with drive means to provide bidirectional angular rotation to thereby vary the relative positions of the pair of apertures with respect to each other to control the energy of the light beam passing therethrough.

12 Claims, 5 Drawing Figures

OPTICAL ATTENUATOR

BACKGROUND OF THE INVENTION

This invention relates to an optical attenuator for adjustably controlling passage of radiant energy and, more particularly, to an optical attenuator for use in a radiant energy analyzer such as a spectrophotometer or the like.

In a radiant energy analyzer, such as a spectrophotometer having a monochromator for providing a source of light of varying wavenumbers, one parameter of the sytem which is varied in addition to the wavelength or wavenumber is the amount of radiant energy passing through the system. This amount of radiant energy is generally controlled by passing the beam of light through a slit, the width of which can be varied by precise predetermined amount. Mechanisms for adjusting the slit opening are known as variable slit width controllers or optical attenuators. Such optical attenuators generally include a pair of thin metal strips mounted in a frame in close sliding relationship with simultaneous movement of the edges of each toward the other decreasing the slit width while maintaining the center of the slit in a fixed geometrical position. In such sliding metal configuration, friction between the sliding surfaces, if too great, can result in distortions of the metal edges forming the slit. Also, a variance in the friction from one edge to the other can result in the slit area being greater than indicated or desired by virtue of the slit edges assuming a trapezoidal shape rather than a rectangular or square shape. Furthermore, in prior art design, when the direction of movement of the sliding strips is reversed, a changeover of forces is encountered from a push to a pull direction or vice versa. In the reversal of direction situation backlash of the sliding surfaces of the metal strip is also encountered and likewise creates problems.

SUMMARY OF THE INVENTION

Accordingly, it is an object of the invention to provide a new and improved optical attenuator for a radiant energy analyzer.

It is another object of the invention to provide an optical attenuator which minimizes friction and backlash.

It is a further object of the invention to provide an optical attenuator with adjustment means for minimizing friction and backlash.

The foregoing and other objects of the invention are accomplished by providing an optical attenuator having a metal strip formed into a continuous loop encircling a pair of parallel shafts mounted on a frame on opposite sides of a window opening. The free ends of the metal strip are preferably secured to one of the shafts, with the metal strip having a pair of apertures formed in opposite portions thereof to be in alignment with each other and with the window in a given angular position of the shaft to which the free ends are secured. Bias means are provided to engage at least one portion of the strip to urge that portion toward the opposing portion to position the surfaces surrounding the apertures in sliding relation with each other. Cam means are preferably provided to coact with one of the shafts to thereby vary the spacing between the shafts to vary the tension in the loop. Drive means are connected to one of the shafts for providing bidirectional angular rotation to vary the relative positions of the two apertures with respect to each other to control the energy of the light beam passing therethrough.

The novel features which are believed to be characteristic of the invention are set forth with particularity in the specification which can best be understood by reference to the following description taken in conjunction with the accompanying drawings.

DESCRIPTION OF THE PREFERRED EMBODIMENT

Figure 1:
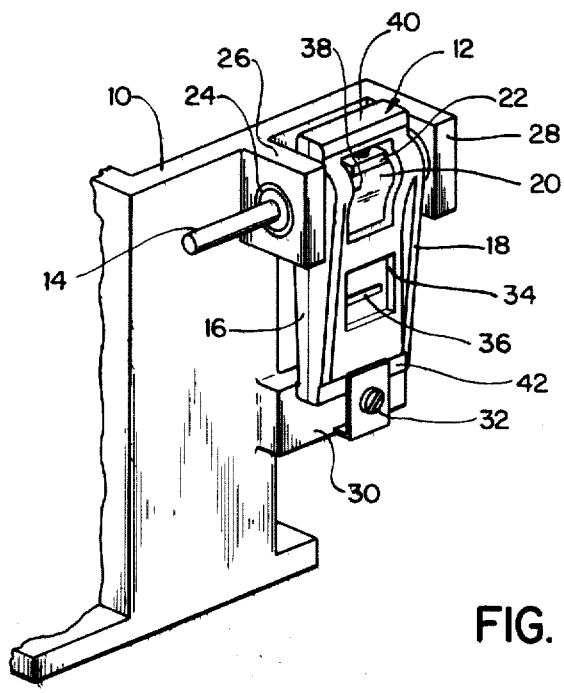
FIG. 1 is a perspective view of a prior art optical attenuator.
Figure 2:
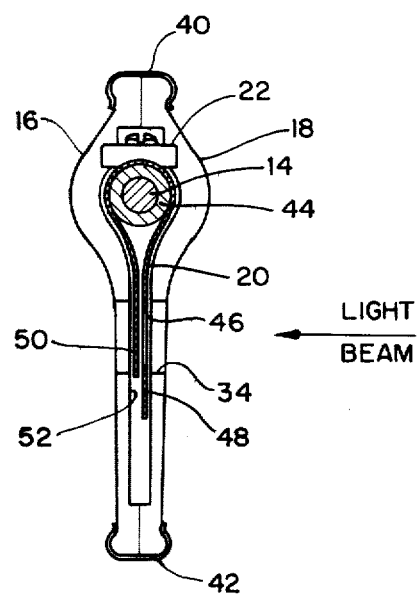
FIG. 2 is an enlarged, diagrammatic, cross-sectional view taken generally from the left side of FIG. 1 through the slit width device of the optical attenuator.

Referring now to the drawings and particularly to FIGS. 1 and 2, there is shown a prior art optical attenuator which includes a frame 10 having a variable slit width device 12 mounted thereon. The device 12 includes a shaft 14, a two-piece housing 16 and 18 and a metal strip 20 secured by means of a fastener 22 to the shaft 14. The device 12 is secured to the frame 10 by means of the shaft 14 extending through bearings 24 inserted in flanges 26 and 28 to thereby position the upper portion of the device 12, with the lower portion thereof being secured to a mounting bar 30 by means of a clamp and screw assembly 32.

The variable slit width device 12 is formed from the two substantially identical mating housing pieces 16 and 18, the housing including a window opening 34 which is slightly larger than the maximum slit 36 opening. The upper end of the housing 16 and 18 is enlarged and provided with a second opening 38 to accommodate the shaft assembly, including the shaft 14. The two portions 16 and 18 of the housing are secured at opposite ends by means of spring clips 40 and 42 to hold the portions in close mating relationship.

Referring now to FIG. 2, the device 12 is shown in enlarged cross-section with some parts omitted to facilitate the description of the construction and operation thereof. The shaft 14 is secured within a roller member 44 which affixed thereto for concurrent rotation therewith, and draped over the roller 44 is the metal strip 20 which has an aperture 46 formed therein. The metal strip 20 is draped over and secured to the roller 44 by means of fastener 22 to provide unequal length legs 48 and 50 of the metal strip. Leg 48 contains aperture 46 and is the long leg of the strip as contrasted with leg of the tape as contrasted with the short leg 50. The inner surfaces of the housings 16 and 18 are configured to provide a guide passageway 52 of a width slightly greater than the combined thickness of short leg 50 and long leg 48 to thereby maintain the opposing inner surfaces of legs 50 and 48 in mating sliding relationship. The shaft 14 is provided with suitable drive means (not shown) which would generally include a bidirectional motor with a suitable speed reduction to permit limited angular rotation of the shaft 14. Viewing the shaft 14 as shown in FIG. 2 with a clockwise rotation of roller 44 with the long leg 48 of the strip 20 travels downwardly or is "pushed" down into the passageway 52 while the short leg 50 travels upwardly, or is "pulled" into the upper portion of passageway 52, the result being that more light from the light beam indicated by the arrow passes through the aperture 46. Conversely, to decrease the amount of light passing through the aperture 46, rotation is counterclockwise, causing the short leg 50 to be pushed downwardly and the long leg 48 to be pulled upwardly. In such devices in order to maintain a well defined slit without distortions or abberations created by the slit opening, the metal strip 20 is usually quite thin. Consequently, any friction or backlash encountered can result in errors in slit width opening and ultimately erroneous readings.

Figure 3:
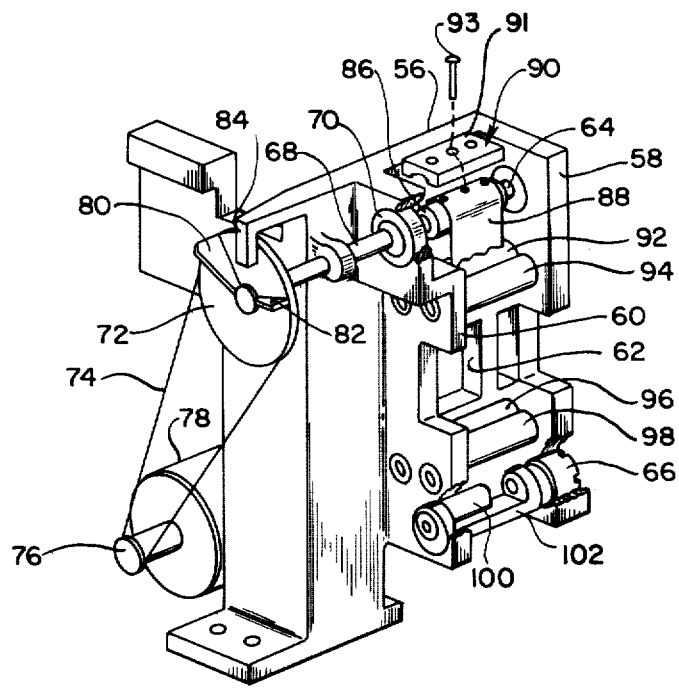
FIG. 3 is a partially broken away perspective view of an optical attenuator according to the present invention.
Figure 4:
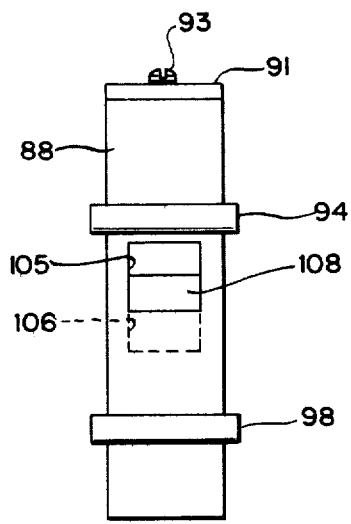
FIG. 4 is a diagrammatic front elevational view of the variable slit width metal strip utilized in the attenuator of FIG. 3.
Figure 5:
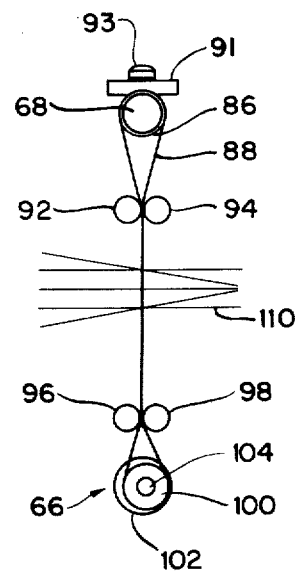
FIG. 5 is a diagrammatic end view of the strip of FIG. 4 and illustrates the shaft assemblies and guide rollers operatively mounting the strip.

Referring now to FIGS. 3-5, the construction of the optical attenuator according to the present invention will be discussed in detail. The attenuator includes a frame member 56 having perpendicularly extending flange members 58 and 60. The flange members 58 and 60 are generally parallel and included in the frame member 56 generally intermediate the flange members 58 and 60 is a window opening 62 through which the radiant energy or light beam passes. Interconnected between flanges 58 and 60 are a first shaft assembly 64 and a second shaft assembly 66, the shaft assemblies being substantially parallel with one disposed on either side of window 62. The upper shaft assembly 64 includes a roller 86 encircling a shaft 68 which is mounted for angular rotation by suitable bearing means 70 fitting apertures in the upper portions of flanges 58 and 60. The shaft 68 terminates at the free end thereof in a pulley 72 which is driven by means of a cable 74 or the like from the pulley 76 of a drive motor 78. The pulley 72 is also provided with stop members 80 and 82 which consist of tabs extending perpendicularly outwardly from the surface thereof. The stop members 80 and 82 are positioned to provide the outer limits of angular rotation of shaft 68, the stop members cooperating with a stationary projection 84 secured to the frame 56. Essentially the stop members 80 and 82 define the fully shut and fully open positions of the slit.

Secured to the roller 86 of the upper shaft assembly 64 is a metal tape or strip 88 which is opaque and substantially nonstretchable, the strip 88 (only partially shown) having the free ends thereof secured to the roller 86 by means of fastener assembly 90. Disposed between flanges 58 and 60 is a first pair of parallel guide rollers 92 and 94 positioned intermediate upper shaft assembly 64 and window 62. Similarly, a second pair of guide rollers 96 and 98 are disposed intermediate window 62 and lower shaft assembly 66.

The strip 88 as shown in FIG. 5 extends from roller 86 through guide rollers 92 and 94, through guide rollers 96 and 98 over the lower roller 100 which is part of the shaft assembly 66, back up through guide rollers 96 and 98, out through guide rollers 92 and 94 with the free ends being secured together on roller 86 by the fastening means 90 including the block 91 and screw 93 extending therethrough into a threaded aperture in roller 86. As can be seen, guide rollers 92 and 94 along with guide rollers 96 and 98 are disposed parallel to each other with the spacing therebetween being generally equal to double the thickness of the strip 88, which in the instant configuration is formed into a continuous loop, by utilization of rollers 92, 94, 96 and 98, friction is minimized when opposite portions of the metal strip 88 slide with respect to each other.

To provide variable adjustment of the tension of the loop, roller 100 is provided with cam means which includes the cam roller 102 (see also FIG. 3) which is a rotatable member secured for rotation between flanges 58 and 60, the length thereof having a substantial portion removed for securing roller 100 for rotation within said cam roller 102. As can be seen, the axis of shaft 104 about which roller 100 rotates is eccentric to or offset from the axis of rotation of cam roller 102 to thereby provide means for adjusting the spacing between the axes of roller 86 and roller 100.

Referring now to FIG. 4, the metal strip 88 is provided with a pair of apertures 105 and 106 which are substantially identically configured and are generally square or rectangular in form. Aperture 105 is formed in the portion of the metal strip 88 in contact with guide rollers 94 and 98 and is depicted as the solid line large square, while aperture 106 is formed in the opposing sliding surface of metal strip 88 intermediate guide rollers 92 and 96 (not shown in FIG. 4) with the shape thereof being defined by the horizontally extending solid line generally bisecting aperture 105 and extending down into the dotted line portion therebelow. In this manner variable slit 108 is formed for passage of the light beam 110 (see FIG. 5) therethrough. The configuration of apertures 105 and 106 is also such that the slit 108 is centrally located with respect to window 62 in frame 56 (see FIG. 3) with window 62 having an area at least equal to or slightly larger than the overall area of either aperture 105 or 106. Window 62 does not interfere with the passage of the light beam through slit 108 regardless of the selected size of slit 108.

Referring again to FIGS. 4 and 5, the operation of the variable slit device will be described. As the roller 86 is rotated clockwise as viewed in FIG. 5, the portion of the metal strip 88 intermediate guide rollers 94 and 98 travels downwardly while the opposing portion of metal strip intermediate rollers 92 and 96 travels upwardly, thereby resulting in slit 108 increasing in size to the maximum opening defined by apertures 105 and 106 being in alignment with each other. Conversely, counterclockwise rotation results in the width of slit 108 decreasing in size to the fully closed position with the upper edge of aperture 106 being in line with or slightly below the lower edge of aperture 105. With the continuous loop construction of the variable slit device and with the adjustability of the tension by means of rotation of cam roller 102, it can be seen that the push-pull changeover of forces in the metal strip 88 is eliminated. The apparatus hereinabove described provides minimal friction between the opposing sliding surfaces of metal strip 88 with virtually no backlash with the tension properly adjusted.

While there has been shown and described a preferred embodiment, it is to be understood that various other adaptations and modifications may be made within the spirit and scope of the invention.

What is claimed is:

1. In an optical attenuator for adjusting the amount of radiant energy passing through a variable aperture therein, the combination comprising:

a frame having a window therein for passage therethrough of a beam of radiant energy;

first and second parallel shafts mounted on said frame on opposite sides of said window for rotation about the axes thereof;

an opaque strip encircling said first and second shafts, the free ends thereof being secured to said first shaft to form a continuous loop, said strip having a width at least equal to the width of said window, said strip having a pair of apertures adapted to be in alignment with each other and with said window in one angular position of said first shaft;

bias means engaging at least one outer surface of said strip to urge the portion of the strip so engaged into sliding relation with the adjacent surface of said strip, said bias means being positioned intermediate said first and second shafts and being configured for noninterference with said beam;

cam means mounted on said frame and engaging at least one of said first and second shafts for displacing the axis of rotation thereof to thereby adjust the tension on said continuous loop; and drive means coupled to one of said shafts for providing bidirectional angular rotation thereof to thereby vary the relative positions of said pair of apertures with respect to each other to control the amount of radiant energy passing therethrough.

2. The combination according to claim 1 wherein said cam means engages said second shaft and includes a cam roller rotatably secured to said frame, said cam roller having an axially cutaway portion, and said second shaft being mounted for rotation within the cutaway portion of said cam roller on axis offset from the axis of said cam roller whereby rotation of said cam roller varies the distance between said first and second shafts.

3. The combination according to claim 2 wherein said bias means includes first and second parallel guide rollers on either side of said window, said guide rollers being positioned intermediate and parallel to said first and second shafts.

4. The combination according to claim 3 wherein said bias means includes a third guide roller paired with and in closely spaced relation and parallel to said first guide roller and a fourth guide roller paired with and in closely spaced relation and parallel to said second guide roller, the respective rollers of each pair of rollers engaging opposing exterior surfaces of said strip, and the spacing between said respective rollers being at least equal to twice the thickness of said strip.

5. The combination according to claim 4 wherein said strip is a metal strip.

6. In an optical attenuator for adjusting the amount of radiant energy passing through a variable width slit therein, the combination comprising:

a frame having a window therein for passage therethrough of a beam of radiant energy;

first and second parallel shafts mounted on said frame on opposite sides of said window for rotation about the axes thereof;

an opaque strip in the form of a continuous loop encircling said first and second shafts and having a width at least equal to the width of said window, said strip having a pair of apertures adapted to be aligned with each other and with said window to define said slit;

means coupling said first shaft in driving engagement with said strip;

bias means engaging at least one outer surface of said strip to urge the portion of the strip so engaged into sliding relation with the adjacent surface of said strip, said bias means being positioned intermediate said first and second shafts; and drive means coupled to said first shaft for effecting bi-directional angular rotation thereof to vary the relative positions of said pair of apertures with respect to each other to vary the width of said slit thereby controlling the amount of radiant energy passing therethrough.

7. The combination according to claim 6 including means for varying the distance between the axes of said first and second shafts to adjust the tension on said continuous loop.

8. The combination according to claim 7 wherein said means for varying includes a cam roller rotatably secured to said frame and having an axially cutaway portion, said second shaft being mounted for rotation within the cutaway portion of said cam roller on an axis offset from the axis of rotation of said cam roller whereby rotation of said cam roller varies the distance between said first and second shafts.

9. The combination according to claim 6 wherein said bias means includes first and second parallel guide rollers on either side of said window, said guide rollers being positioned intermediate and parallel to said first and second shafts.

10. The combination according to claim 9 wherein said bias means includes a third guide roller paired with and in closely spaced relation and parallel to said first guide roller and a fourth guide roller paired with and in closely spaced relation and parallel to said second guide roller, the respective rollers of each pair of rollers engaging opposing exterior surfaces of said strip, and the spacing between said respective rollers being at least equal to twice the thickness of said strip.

11. The combination according to claim 9 including means for varying the distance between the axes of said first and second shafts to adjust the tension on said continuous loop.

12. The combination according to claim 11 wherein said bias means includes a third guide roller paired with and in closely spaced relation and parallel to said first guide roller and a fourth guide roller paired with and in closely spaced relation and parallel to said second guide roller, the respective rollers of each pair of rollers engaging opposing exterior surfaces of said strip, and the spacing between said respective rollers being at least equal to twice the thickness of said strip.

* * * * *